United States Patent [19]
Johnson et al.

[11] Patent Number: 5,352,392
[45] Date of Patent: Oct. 4, 1994

[54] PROCESS FOR MANUFACTURING A CONTINUOUS THREAD BY MECHANICAL DRAWING

[75] Inventors: Timothy Johnson, Vimines; Patrick Moireau, Curienne, both of France

[73] Assignee: Vetrotex France, Chambery, France

[21] Appl. No.: 61,223

[22] Filed: May 17, 1993

[30] Foreign Application Priority Data

May 15, 1992 [FR] France ................ 92 05958

[51] Int. Cl.$^5$ .............. B29C 35/10; B29C 47/02; C03B 37/022
[52] U.S. Cl. ......................... 264/22; 65/450; 65/453; 264/70; 264/136; 264/137; 264/174; 264/211.12; 427/512; 427/513; 427/553
[58] Field of Search ................. 264/22, 70, 136, 137, 264/174, 211.12; 427/508, 512, 513, 553; 65/3.43, 3.44, 4.3

[56] References Cited

U.S. PATENT DOCUMENTS

| | | | |
|---|---|---|---|
| 5,011,523 | 4/1991 | Roncato et al. | 65/4.3 X |
| 5,049,407 | 9/1991 | Soszka et al. | 427/513 |
| 5,171,634 | 12/1992 | Soszka et al. | 428/376 |

FOREIGN PATENT DOCUMENTS

| | | |
|---|---|---|
| 243275 | 10/1987 | European Pat. Off. . |
| 320873 | 6/1989 | European Pat. Off. . |
| 367661 | 5/1990 | European Pat. Off. . |
| 2336776 | 7/1977 | France . |
| 2382079 | 9/1978 | France . |
| 428082 | 7/1967 | Switzerland . |
| 1559413 | 1/1980 | United Kingdom . |

OTHER PUBLICATIONS

Abstract of Japan 01-278,435 (Published Nov. 8, 1989).

*Primary Examiner*—Leo B. Tentoni
*Attorney, Agent, or Firm*—Oblon, Spivak, McClelland, Maier & Neustadt

[57] ABSTRACT

In the manufacture of a continuous thread coated with a mixture which reacts to ultraviolet radiation, a large number of continuous filaments are formed by mechanically drawing a large number of molten thermoplastic material streams flowing from openings in at least one device. A mixture in the liquid state which can react under the effect of ultraviolet radiation is deposited onto the surface of at least some of the filaments before they are combined to form at least one thread. The thread is wound into the form of a winding on a rotating support, and exposed to ultraviolet radiation during the winding operation.

8 Claims, 1 Drawing Sheet

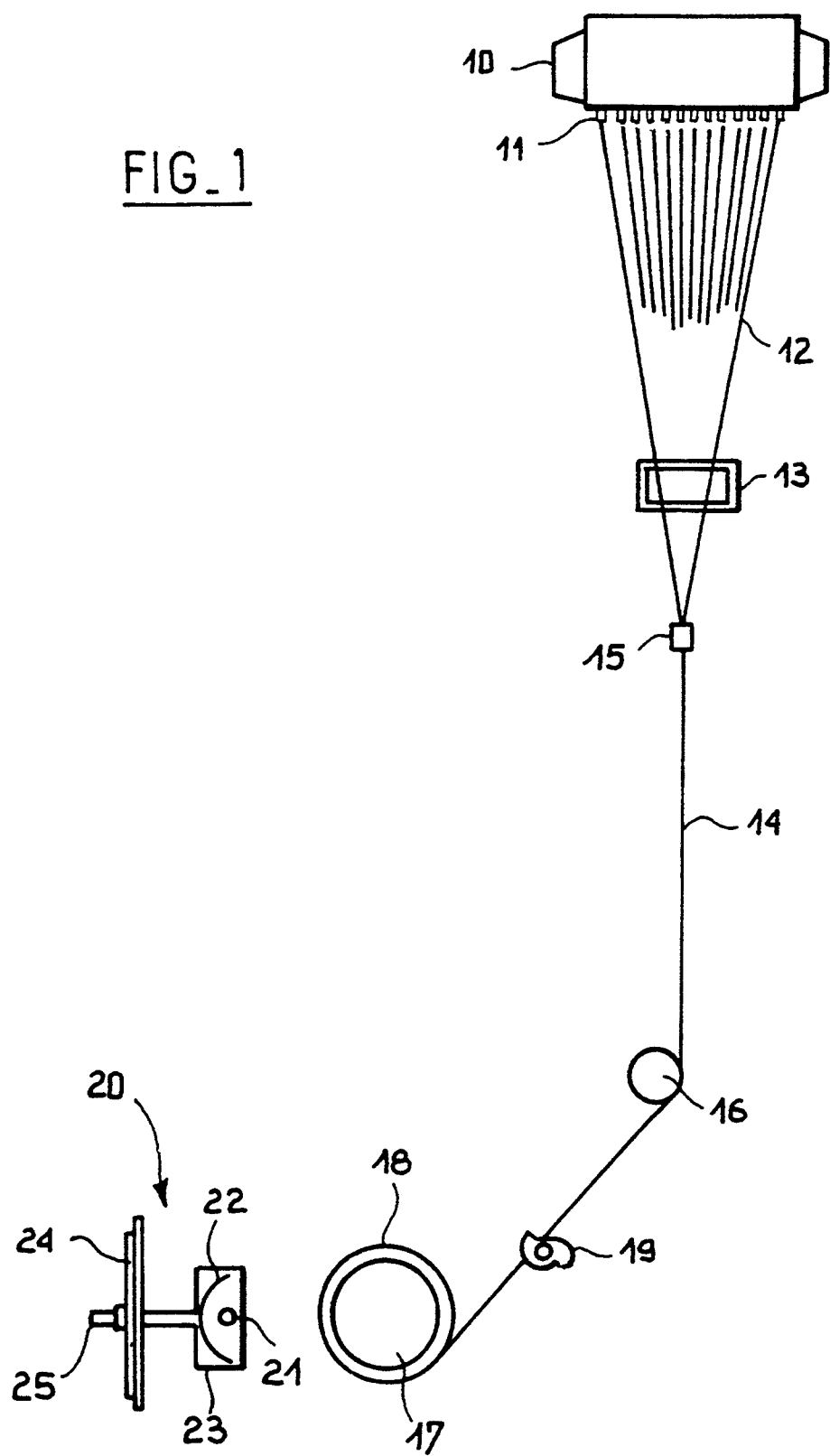
FIG_1

PROCESS FOR MANUFACTURING A CONTINUOUS THREAD BY MECHANICAL DRAWING

BACKGROUND OF THE INVENTION

1. Field of the Invention

The present invention relates to a process for manufacturing a continuous thread formed of a large number of continuous filaments of which at least some are covered with a resin mixture in the liquid state which reacts or cross-links so as to harden when subjected to ultraviolet radiation. More precisely, the invention is directed to a process for manufacturing a continuous thread which is at least partially formed of filaments intended to serve as a reinforcement, such as glass filaments.

2. Description of the Related Art

It is known to impregnate a glass fiber based fabric or roving with a resin mixture which reacts when exposed to ultraviolet radiation. This is the case in the manufacturing process described in French patent application FR-A-2 336 776 and its certificate of addition FR-A-2 382 079.

In accordance with these documents, a glass fiber roving, extracted from a winding, passes through a bath of reactive mixture before running parallel with a tube emitting ultraviolet radiation. In order for the resin mixture impregnating the roving to polymerize and crosslink, the velocity at which the roving moves in front of the emitter tube is relatively low.

This type of indirect process is only practical when the low velocity of less than one meter per second can be considered less disadvantageous than the great advantages it offers.

This is unlike a direct process in which the mixture is deposited on the thread during the manufacturing process of the glass thread itself, and in which the thread velocity, of more than several meters per second, is imposed by the process.

It is this type of process which is used, for example, for obtaining optical fibers. Each optical fiber is obtained by the mechanical drawing of the end of a preform softened by heat. As soon as it is formed, the optical fiber must be protected from moisture and any contact likely to cause the appearance of defects on its surface. For this reason, a reactive mixture is applied to the fiber such that it is completely covered. Immediately after this coating has been deposited, the fiber is exposed to ultraviolet radiation emitted by one or a plurality of tubes disposed parallel to its path, before it is wound. Since the drawing velocity of an optical fiber can reach 5 to 10 meters per second and the layer of mixture which is to be deposited is not inconsiderable, the polymerization speed of the applied mixture must be high. A mixture of this type comprises expensive constituents and its use sometimes requires the use of safety measures. A process of this type is described for example in U.S. Pat. No. 4,099,837.

Within the field of glass fibers intended for the reinforcement of resinous materials, it is likewise known to deposit a mixture which reacts under the effect of ultraviolet radiation on the surface of the filaments during the fiber-drawing operation. The filaments obtained by the mechanical drawing of glass streams flowing from openings in a die plate are coated with the reactive mixture before being combined to form a thread which is exposed to ultraviolet radiation over part of its path before being wound. A process of this type is described in EP-B1 243 275.

This process is advantageous, as are all direct processes, insofar as it enables a product to be obtained which avoids the need for a supplementary step which is expensive in terms of time, material and space. However, it is subject to certain constraints.

The drawing velocity of the filaments, which is generally far higher than that of optical fibers, requires extremely reactive mixtures to be used.

Furthermore, the ultraviolet radiation source or sources used is/are regulated such that the radiation is focused on part of the path of the thread in a narrow area. The polymerization and/or cross-linking of the mixture covering the thread is uniform if the thread does not deviate from this area. At high velocities, however, the thread can vibrate, which will move it slightly away from this area, which modifies the reaction rate of the mixture over part of the thread.

In addition, the vibration of the thread causes localized temporary separation of filaments or groups of filaments in the irradiation area. The polymerization and/or cross-linking, which is at least partial, occurring during this separation phase does not produce a thread of which the integrity is constant over its entire length.

SUMMARY OF THE INVENTION

It is an object of the present invention to provide a direct process for manufacturing a continuous thread which eliminates the constraints of the known processes.

It is a further object of the present invention to provide a direct process for manufacturing a continuous thread which can be coated with a mixture of which the reactivity may be less than that conventionally required by the known direct process.

It is yet a further object of the present invention to provide a direct process enabling a thread of which the characteristics are uniform over its entire length.

These and other objects are achieved by means of a process for manufacturing a continuous thread according to which a large number of continuous filaments are formed by mechanically drawing a large number of molten thermoplastic material streams flowing from openings in at least one device, depositing onto the surface of at least some of the filaments a mixture in a liquid state which can react under the effect of ultraviolet radiation before combining them to form at least one thread, winding the thread into the form of a winding onto a rotating support, and exposing the winding to ultraviolet radiation during the winding operation.

The invention also applies to processes for manufacturing a composite or mixed thread formed of filaments of different thermoplastic materials.

Thus, the invention applies to a process for manufacturing either a thread formed by the combination of continuous glass filaments and a thermoplastic organic material. The former are obtained by the mechanical drawing of streams of molten glass flowing from openings in a die plate heated by the Joule effect; the latter are obtained by the mechanical drawing of streams of molten material extruded through the openings in a spinning head. A process of this type is described for example in patent application EP-A1-367 661.

Within the context of the present invention, the glass filaments are coated with a mixture which reacts to ultraviolet light before being combined with the organic filaments. The mixed thread is wound onto a rotating support and the winding is exposed to an ultraviolet radiation source as soon as winding begins.

The invention also relates to a process for manufacturing a continuous thread formed exclusively of filaments of a given thermoplastic material. Thus the invention applies to a process for manufacturing glass threads formed from a large number of continuous glass filaments.

The present invention is highly advantageous with respect to the conventional direct process as demonstrated by the following comparison.

In accordance with the known direct process, a mixture is polymerized on the thread as a result of the thread being subjected to radiation emitted by one or more sources disposed parallel to its path. For high drawing velocity which is current in the so-called glass fiber reinforcement industry, for example 50 meters per second, the radiation time for the thread is 0.015 seconds as a result of 3 ultraviolet irradiation sources being disposed in a line, each source comprising a tube 25 cm long.

At the same drawing velocity, the average irradiation time for the thread on the winding in the process of forming according to the invention is approximately 0.5 seconds, using a single radiation source directed towards the outer surface of the winding.

The very great increase in the irradiation time of the thread, which may reach several seconds, offers the possibility of varying the manufacturing conditions within limits which were hitherto unexpected for a direct process.

Thus, with respect to the known direct process, it is possible by means of the invention to use a mixture which is far less reactive at similar drawing velocities. This possibility considerably increases the range of mixture formulations which can be used within the context of a direct process. Thus, products of which the reactivity was judged to be insufficient for use in the composition of a mixture employed in a conventional direct process can henceforth be used. This advantage is particularly important insofar as these products are compatible with different materials to be reinforced. Monoacrylate urethane monomers which are compatible with polyamide type materials can be cited for example.

Insofar as the invention enables less reactive mixtures to be used, these mixtures can be more economical than those used hitherto in a direct process. For example, light primers, a term which covers both light-initiators, i.e., compounds which are directly responsible for intramolecular scission, and light-sensitizers, i.e., compounds causing activation of the molecule, can be used in proportions which are far lower than those of the mixtures used hitherto for a direct process. These compounds are among the most costly constituents of these reactive mixtures.

Thus, with respect to the light primer, a conventional mixture preferably comprises 8 to 12 weight percent of light-initiator when the drawing velocity is high and/or when the required conversion level is high. For similar drawing velocities and conversion levels, the mixtures used within the framework of the invention only comprise 3 to 5% of light-initiators.

As in all polymerization processes, it is difficult to obtain a conversion level of greater than 75%. It is important to reach a high conversion level since it enables certain characteristics, such as resistance to traction of the thread, for example, to be improved.

Furthermore, when the conversion level is relatively low, the mixture deposited onto the thread may develop in an uncontrollable fashion as a function of its storage conditions. This phenomenon helps to modify the properties of the thread in an unpredictable manner.

Owing in particular to the increase in the irradiation time, the present invention enables very high conversion levels to be attained which are difficult, or even impossible, to attain in a direct process in which the thread is irradiated in a line.

It is also possible to use a highly reactive mixture which then allows the fiber-drawing velocity to be increased in accordance with the invention. This possibility enables products to be produced which hitherto could not be produced within the context of a direct process owing to the high drawing velocities they require.

The present invention also enables higher drawing velocities to be achieved than those permitted within the context of the known direct process for a further reason. In effect, according to this latter process, the stability of the thread in the polymerization area is all the more difficult to maintain, the higher its drawing velocity, hence the above-mentioned disadvantages.

The present invention overcomes the disadvantages resulting from the vibration of the thread insofar as its irradiation is performed when it has been deposited on the winding and the distance between the outer surface of the winding and the ultraviolet radiation source is there well defined. This enables an integral fiber to be obtained which is coated with a mixture of which the conversion level is constant over the entire length of the thread.

The present invention also permits installations for performing a direct process to be simplified.

Thus in the known direct process, the reactive mixture can be polymerized as a result of the ultraviolet radiation sources being multiplied, which enables the intensity of the radiation to be intensified by concentrating them at the same location or by increasing the irradiation time and disposing them in a line. In the same conditions (type of mixture, drawing velocity, etc.), the present invention enables an equivalent reaction rate to be obtained using a single ultraviolet radiation source. This source is disposed to extend parallel to the axis of rotation of the support onto which the winding is wound; it is provided with an elliptical or parabolic reflector according to the required concentration of the radiation on the surface of the winding.

The source can be provided as a tube of which the length is selected such that the winding is continuously irradiated over its entire length. A source of this type can be used for straight-sided windings.

The source can also be provided as a tube of which the length is less than the total length of the winding. This is advantageous in the case of long windings which are formed on a rotating support which, in addition, oscillates perpendicular to the thread. The source is then applied only to the thread winding area and irradiates the winding as it forms.

It is evidently possible to use a plurality of sources of which the tubes are disposed parallel to the axis of the support onto which the winding is wound. The rays emitted by these sources can converge towards the same surface area of the windings or towards different areas. This embodiment further increases the adjustment possibilities offered by the invention.

In certain cases, the winding has to be irradiated in a chamber, which enables it to be surrounded with an atmosphere of a neutral gas such as nitrogen or the ozone produced in the presence of air to be eliminated.

The considerable increase in the irradiation time enables the emission power of the ultraviolet radiation sources to be reduced, most particularly in the presence of a neutral gas atmosphere.

Finally, in a given number of cases, it is possible to reach a sufficient reaction rate without the thread having to be surrounded with a neutral gas atmosphere.

Generally, for a thread having a relatively low weight percentage of mixture, a single irradiation of the winding enables a conversion level to be attained which is sufficient for large-scale adhesion of the thread over the entire winding to be avoided. In order to obtain a high percentage of mixture over the thread, the drawing velocity is generally reduced and the vibrations to which the thread is subjected are then negligible. Furthermore, a high percentage of mixture imparts excellent cohesion to the thread. Under these conditions, it is advisable to subject the thread, before it is wound, to radiation from at least one irradiator in order to initiate polymerization and/or cross-linking of the mixture before the thread comes into contact with the winding. This prevents the turns of the thread adhering to one another, which would render the winding useless. Far more complete polymerization can then be performed as a result of the winding being irradiated. In general, the melting loss, by means of which the weight percentage of the mixture is measured, is less than or equal to 3%. Above this value, the risks of the turns adhering becomes considerable.

BRIEF DESCRIPTION OF THE DRAWING

The process according to the invention will be better understood from the following detailed description illustrated by the single appended Figure. The Figure shows a front schematic view of an installation for performing the invention.

DETAILED DESCRIPTION OF THE PREFERRED EMBODIMENTS

In the Figure, a die plate 10 generally made of metal alloy is heated by the Joule effect. This die plate is used to remelt the glass or maintain glass coming from a source (not illustrated) in the molten state.

The base of the die plate 10 is perforated with a large number of openings which may or may not be extended by tubes 11 which have a small diameter and from which streams of molten glass flow. These streams are drawn mechanically in order to produce continuous filaments 12.

These filaments 12, forming at least one fan-like sheet, pass over a coating device 13 where they are covered with the reactive mixture. This device 13, well known to persons skilled in the art, consists of an applicator lined with a felt moistened with reactive mixture by means of a metering pump.

The filaments 12 thus coated with mixture are combined to form a thread 14 by means of a member such as an assembly pulley 15. This thread is then guided by at least one guiding member, for example a small wheel 16, before being wound onto a rotating spindle 17. This spindle is moved by a motor secured on a frame (not illustrated). The thread 14 is wound in the form of a helical winding 18 by means of a member 19 for axially distributing the thread, such as a traversing member.

While it is being wound, the thread 14 is subjected to the action of ultraviolet radiation by means of the device 20. This device comprises an emitter tube 21 which may be at high, average or low pressure and is energized by means of electrodes or microwaves. The emitter tube may be doped with rare gases or metal halides and is selected primarily on account of its emission spectrum.

As with the nature and content of the various compounds forming the reactive mixture, and the amount of energy received by the winding, the emission spectrum is one of the factors whose choice enables the required reaction rate to be attained.

A parabolic reflector 22 is mounted behind a tube 21 and focuses the radiation onto a given area of the winding 18. The tube/reflector assembly is mounted on a casing 23 integral with a support 24 by means of a sliding rod 25. This rod enables the distance between the tube 21 and the surface of the spindle 17 to be initially set. If the required conversion level is very high, this distance is maintained constant during the entire winding operation. On the other hand, if the required conversion level is less than approximately 90%, it is desirable to maintain a constant distance between the surface of the winding which is forming and the irradiator or to vary the amount of energy received by the winding over time. In the first case, the irradiator may be mounted on an arm whose movement away from the axis of the spindle 17 is controlled by a servo device. In the second case, the amount of energy is regulated by a system of flaps whose closure is controlled by the velocity at which the winding increases in size. The tube 21 extends parallel to the axis of winding on the spindle 17 and is selected such that the winding in the process of forming is subjected to the continuous and uniform action of the ultraviolet radiation which it emits over an area extending over the entire axial length of the winding.

The time during which the thread is irradiated depends on the shape of the winding and thus to a certain extent on the type of member selected to distribute the thread onto the spindle, the winding velocity, and the width of the irradiation area.

This time can be regulated in accordance with the required conversion level which depends on the final application of the resultant thread. Thus, all things being equal, this time can be increased or reduced as a result of the irradiation area being enlarged or narrowed by means of a system of sliding flaps which are situated on the irradiator and of which the degree of opening controls the width of radiation emitted.

A comparative example will enable the advantages of the present invention with respect to a direct process according to which the thread is irradiated in a line to be appreciated.

Manufacture of a Thread According to the Prior Art

A glass fiber is manufactured from a die plate made of a platinum-rhodium alloy heated by the Joule effect and having 408 openings. The glass with which the die plate is fed has a composition substantially comprising silica, aluminum, alkaline earth oxides such as lime and possibly magnesium, and boric anhydride. This type of glass is generally known under the name of E glass. The reactive mixture is deposited on the filaments being drawn by means of a felt-lined applicator.

Over its path between two guide members the thread is subjected successively to ultraviolet radiation emitted by three radiation devices in a line. Each device is provided with a mercury vapor tube which is 25 cm long and has a power of 120 watts per linear cm of tube. An elliptical reflector at the rear of the tube ensures that the rays converge onto the passage of the thread.

The thread consisting of 408 filaments of an average diameter of 9 μm has a yield of 68 tex (grams/kilometer). The distribution member is selected such that a straight-sided winding is produced.

Manufacture of a Thread According to the Invention

The thread is manufactured from an identical die plate supplied with the same glass in the same conditions. The winding, likewise with straight sides, is irradiated by a device provided with a mercury vapor tube which is 40 cm long and has a power of 80 watts per linear cm of tube. A parabolic reflector is located behind the tube.

The mixture applied to the two threads has the following composition expressed as weight percentages:

| | |
|---|---|
| isobutyl stearate | 4.25% |
| silicone acrylate (marketed under the name Ebecryl 1360 by Union Chemique Belge) | 14.25% |
| diacrylate carbonate (marketed under the name Acticryl CL 993 by Harcros) | 14.25% |
| N-vinyl pyrrolidone | 33.25% |
| oxyethylated trimethylolpropane-triacrylate (marketed under the name SR 454 by Cray Vallée) | 19.00% |
| 1-hydroxyhexyl phenylketone (marketed under the name Irgacure 184 by Ciba-Geigy) | 10.00% |
| oxyethylated trimethoxysilane (marketed under the name Silane Y 5889 by Union Carbide) | 5.00% |

The melting loss on these two threads was of the order of 1%.

The resistance to traction of each of the threads was measured on 15 cm long samples subjected to traction at a velocity of 400 mm/min.

The average resistance to breaking under traction was respectively 1237 MPa for the thread irradiated in a line and 1650 MPa for the thread obtained according to the invention.

The conversion level of a mixture of the preceding type was between 60 and 75% for the thread irradiated in a line and was greater than 90% for the thread according to the invention.

The aptitude to weaving of the threads was tested on a Muller rapier weaving machine; it was mediocre for the thread irradiated in a line and good for the thread according to the invention.

This example is given by way of illustration and is not restrictive. The invention applies to threads formed from other types of glass, in particular glasses known to impart excellent mechanical, chemical or dielectric properties to the thread. Thus the invention applies to threads formed from glasses substantially comprising silica, aluminum, lime and magnesium, such as for example the glass known under the name R glass, or substantially comprising silica, aluminum and magnesium, such as for example the glass known as S glass.

In particular the invention applies to threads formed from glasses known for their chemical resistance to strongly alkaline media. This is the case in particular of threads marketed under the trade mark "CEMFIL" of which the composition substantially comprises silica, zirconium oxide and alkaline oxides.

The invention also applies to threads formed from glasses comprising more than 90 weight % of silica and boric anhydride known for their low dielectric constant and angle of loss tangent, such as D glass.

The invention also applies to mixed threads formed, for example, by the combination of filaments of E glass and thermoplastic organic filaments. A thread of this type is produced directly for example according to the process described in patent application EP-A-367 661. In this type of thread, the number and/or diameter of the glass filaments it comprises is/are such that the latter generally represent between 10 and 90 weight % of the thread. The extruded and spun organic material is selected from among polypropylenes, polyamides or polyesters.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. Process for manufacturing a continuous thread, comprising the steps of:
   forming a large number of continuous filaments by mechanically drawing a large number of molten thermoplastic material streams flowing from openings in at least one device;
   depositing on the surface of at least some of the filaments a mixture in a liquid state which reacts under the effect of ultraviolet radiation;
   subsequently combining the filaments to form a thread;
   winding the thread into the form of a winding on a rotating support; and
   exposing the thread wound on the winding support to ultraviolet radiation during the winding step.

2. Process according to claim 1, wherein the large number of continuous filaments are formed by mechanically drawing a large number of streams of at least two different thermoplastic materials flowing from openings in at least two different devices, and wherein the mixture in the liquid state which reacts under the effect of ultraviolet radiation is deposited onto the surface of the filaments of one of the materials.

3. Process according to claim 2, wherein one of said devices comprises a die plate heated by the Joule effect and another of said devices comprises a spinning head.

4. Process according to claim 1, wherein said at least one device comprises at least one die plate heated by the Joule effect.

5. Process according to any one of the preceding claims, wherein said exposing step is continuously performed during said winding step.

6. Process according to any one of claims 1 to 4, wherein said rotating support is moved with an oscillating movement along its axis and subjected to ultraviolet radiation only to the thread winding area.

7. Process according to any one of claims 1 to 4, including a step of maintaining constant a distance between a source of the ultraviolet radiation and a surface of the wound thread during said winding step.

8. Process according to any one of claims 1 to 4, including the step of regulating the amount of energy received by the thread during said winding step as a function of the speed of the thread in said winding step.

* * * * *